(12) United States Patent
Casiraghi

(10) Patent No.: US 6,555,605 B1
(45) Date of Patent: *Apr. 29, 2003

(54) FLAME-RETARDANT COMPOSITION FOR POLYMER COMPOUNDS

(75) Inventor: Flavio Casiraghi, Osnago (IT)

(73) Assignee: Pirelli Cavi E Sistemi S.p.A., Milan (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/934,890

(22) Filed: Sep. 22, 1997

(30) Foreign Application Priority Data

Sep. 23, 1996 (IT) .......................................... MI96A1948

(51) Int. Cl.⁷ ............................. H01B 7/00; C08K 3/22; C08K 3/26; C08K 5/51
(52) U.S. Cl. ...................... 524/126; 524/100; 524/127; 524/145; 524/425; 524/427; 524/436; 174/110; 174/121 A
(58) Field of Search ................................ 524/436, 126, 524/127, 145, 425, 427, 100; 174/110, 121 A

(56) References Cited

U.S. PATENT DOCUMENTS

| | | | | |
|---|---|---|---|---|
| 4,560,719 A | * | 12/1985 | Nakamura et al. | 524/412 |
| 4,869,848 A | * | 9/1989 | Hasegawa et al. | 524/412 |
| 5,409,976 A | * | 4/1995 | Lindsay | 524/100 |
| 5,412,014 A | * | 5/1995 | Romenesko | 524/416 |
| 5,475,041 A | * | 12/1995 | Weil et al. | 524/100 |
| 5,482,990 A | * | 1/1996 | Jow et al. | 524/436 |
| 5,514,743 A | * | 5/1996 | Pernice et al. | 524/414 |
| 5,523,342 A | * | 6/1996 | Nagaoka et al. | 524/230 |
| 5,684,117 A | * | 11/1997 | Londa et al. | 524/405 |

FOREIGN PATENT DOCUMENTS

| | | |
|---|---|---|
| EP | 0 305 745 | 3/1989 |
| GB | 2 163 167 | 2/1986 |
| JP | 63-213809 | 9/1988 |
| JP | 3-226910 | 10/1991 |
| JP | 7-90157 | 4/1995 |

OTHER PUBLICATIONS

John S. Dick, "Compounding Materials for the Polymer Industries—A Concise Guide to Polymers, Rubbers, Adhesives, and Coatings", Noyes Publications, pp. 63, 144 and 259, 1987.

J.W. Lyons, The Chemistry and Uses of Fire Retardants, Chap. 2, Chemistry of Fire Retardants Based on Phosphorus, Wiley–Interscience Ed., 1970.

* cited by examiner

*Primary Examiner*—Peter Szekely
(74) *Attorney, Agent, or Firm*—Finnegan, Henderson, Farabow, Garrett & Dunner, LLP

(57) ABSTRACT

Additive composition for polymer compounds containing magnesium hydroxide, calcium carbonate at least a phosphorus compound and at least a nitrogen compound, capable of conferring flame-retardant properties to the polymer compounds to which it is added, maintaining the mechanical properties of said compound within limits acceptable for the use of the end product.

32 Claims, No Drawings

FLAME-RETARDANT COMPOSITION FOR POLYMER COMPOUNDS

The present invention refers to a halogen-free additive composition, for polymer compounds with a halogen-free polymer base, that confers flame-retardant properties to the polymer to which it is added.

The present invention also concerns polymer products containing said flame-retardant composition; a preferred embodiment concerns the use of said polymer products containing the flame-retardant composition of the invention as a coating for telecommunication and low-voltage power transmission cables. The aforesaid cables coated with the polymer product containing the flame-retardant composition in question are also included within the framework of this invention.

Among the possible ways of making a polymer compound flame-retarded, one solution may be to add a halogenated substance to the base polymer. As an alternative, it is possible to use halogenated polymers (such as polyvinyl chloride) which reduce the inflammability of the compound. Nevertheless, these solutions present the drawback that the halogenated products of decomposition are toxic, so the use of these materials is inadvisable, at least for use in closed environments.

One halogen-free flame-retardant additive that endows polymer compounds with resistance to flame propagation is magnesium hydroxide (see, for example, patent GB 2 163 167). This substance is particularly appreciated for the fact that it does not begin to decompose until it reaches 220° C. and is thus able to withstand the various processing phases of the base polymer compound without degrading. However, to endow the polymer with these flame-retardant properties, a rather large quantity of magnesium hydroxide must be added. This may alter the mechanical properties of the polymer, particularly reducing drastically the extensibility of the polymer products so prepared. Other inorganic extenders, also capable of lending flame-retardant properties to the polymer to which they are added, have a weaker flame-retardant action than magnesium hydroxide.(e.g. the basic hydrated carbonates of aluminum and magnesium or sodium), which requires the use of greater quantities, with the result of markedly worsening the mechanical properties of the product. Other inorganic flame-retardant additives, such as the compounds of boron or aluminum hydroxide, since their decomposition temperature is below 200° C., are unsuitable as additives to the compound before the processing phases, typically effected, at higher temperatures, such as some types of polymer extrusion. Other inorganic substances (such as fiberglass, calcined kaolin, calcium carbonate,), unlike the substances cited earlier, at normal combustion temperatures undergo no decomposition reactions to give products capable of actively interfering with the combustion process (calcium carbonate, for example, decomposes at about 825° C.). Nonetheless, these substances are used as inert extenders to produce a "dilution effect" in plastics (see, for example, the volume "Compounding Materials for the Polymer Industry", J. S. Dick 1987, Noyes publ., particularly pages 63 and 144). The result is that the combustibility of the compound is reduced as a consequence of the fact that there is less polymer material per unit of volume that can burn.

Another group of additives that can explicate a flame-retardant effect are the phosphorus-based flame-retardants (see, for example, the reference book *The Chemistry and Uses of Fire Retardants,* Chap. 2, J. W. Lyons, Wiley-Interscience Ed., 1970).Typical compounds containing phosphorus suitable for use as flame-retardant additives may be salts of phosphorous or phosphoric acid (phosphites, phosphates and polyphosphates), organic esters or polyesters of phosphoric acid (mono-, di- or tri-alkyl or -aryl phosphates or polyphosphates), phosphites (mono-, di- or tri-alkyl or -aryl phosphites), phosphonates or polyphosphonates (mono or dialkyl or -aryl phosphonates or polyphosphonates). Some phosphate compounds usable as flame-retardant additives also possess plasticizing properties and may thus modify the mechanical properties of the polymer, reducing the rigidity of the finished material. On the other hand, this characteristic limits the use of these additives in the polymer compound, since large quantities may cause a decrease in the mechanical resistance of the polymer. The alternative use of red phosphorus, when the quantities used are sufficient to provide the desired flame-retardant effect, may also have a negative impact on the electrical properties of the final compound, in addition to lending the compound a red coloration. Therefore, the need to add small quantities of these phosphorus compounds consequently limits the capacity to endow the base polymer with sufficient flame-retardant properties.

Besides just phosphorus compounds, it is also possible to use blends of phosphorus and nitrogen compounds as flame-retardant additives for polymers. These flame-retardant are, also indicated as "P-N blends (or additives)" (see *The Chemistry and Uses of Fire Retardants,* Chap. 2, J. W. Lyons, Wiley-Interscience Ed., 1970, page 20 and chap. 2).

Said nitrogen compounds may be inorganic salts such as ammonium salts, or organic compounds and their organic salts, such as guanidine, melamine and their derivatives (e.g. melamine cyanide or guanidilurea and their salts). Compounds containing both phosphorus and nitrogen may also be used, such as phosphates or polyphosphates of ammonium, guanidine or melamine, phosphoramides, phosphorylamides, phosphonated starch and phosphazene compounds.

Nevertheless, the use of these blends, in addition to the problems already mentioned for the use of phosphorus compounds, presents additional drawbacks associated with the possible toxicity of the products of decomposition of the nitrogen compounds. Nitrogen-based can therefore be added only in limited quantities, which reduces their flame-retardant capacity.

Patent GB 2 163 167 describes a flame-retardant composition for olefin polymers and copolymers containing magnesium hydroxide, red phosphorus and carbon black. Besides the aforesaid disadvantages to the use of red phosphorus, however, it was also observed that the use of carbon black also presents some practical drawbacks, such as a black color to the compound and a reduction of its electrical properties.

It has been found now that a composition according to the invention, containing magnesium hydroxide, calcium carbonate and a small quantity of P-N blend satisfies the need to lend the desired flame-retardant properties to the polymer compound to which it is added while maintaining the mechanical properties of the compound within limits acceptable for the use of the end product. This polymer compound may therefore be advantageously used for coating a conductor, e.g. of copper or aluminum, thus obtaining a cable with flame-retardant coating according to the present invention.

A surprising aspect of the invention (as observed in tables 2 and 3 of the examples) is the fact that a composition containing only magnesium hydroxide and a P-N compound does not ensure the necessary flame-retardation requisites in the final compound. A similar behavior can also be observed in a composition containing only calcium carbonate and the P-N compound. A composition containing magnesium hydroxide, calcium carbonate and a P-N compound, on the contrary, provides the desired flame-retardant properties in the final compound.

The desired flame-retardant characteristics are provided by adding a predetermined quantity of a composition containing magnesium hydroxide, calcium carbonate, at least a phosphorus compound and at least a nitrogen compound to the base compound.

The term "predetermined quantity" is used to mean a quantity of said composition, containing each of the aforesaid components in a determined ratio, capable of imparting the desired flame-retardant properties to the polymer compound, such as to maintain the mechanical properties of the compound within acceptable values. As illustrated here below, both the ratio of total flame-retardant composition to base polymer and the quantitative ratios of the various components of the composition can be suitably varied without compromising the characteristics of flame-retardation or mechanical resistance in the final compound.

In general, the flame-retardant composition of the invention is added to the base polymer with a ratio varying from 1:1 to 2:1 by weight, preferably about 1.4:1 to 1.6:1, with a quantity by weight of flame-retardant composition about 1.5 times the quantity of base polymer being preferred.

The magnesium hydroxide used in this flame-retardant composition can be properly obtained by precipitation. Typically, it has a specific surface of about 3–10 $m^2/g$, preferably about 5–10 $m^2/g$, while the mean particle diameter varies from about 0.3 to about 2.0 $\mu m$. Said particles are preferably coated to enhance the workability of the polymer compound. Advantageously, they may be coated with strearic acid or with sodium strearate. The magnesium hydroxide marketed under the name Kisuma 5A (Kiowa Chem. Ind.) could be advantageously used.

Regarding the calcium carbonate, it was observed that to obtain the desired flame-retardant effect of the composition, it is preferable for it to be in sufficiently fine form. Advantageously, calcium carbonate may be employed having a particle size such a that the specific surface of the salt is higher than about 10 $m^2/g$, preferably between 10 and 30 $m^2/g$, with a specific surface of 25 $m/g$ being particularly preferred. Typically; the mean diameter of the particles ranges varies from about 0.070 to about 0.085 $\mu m$, preferably from about 0.075 to about 0.080 $\mu m$. As for the magnesium hydroxide, the calcium carbonate particles may also be advantageously coated with strearic acid or sodium strearate to enhance the workability of the polymer compound. Calcium carbonate with the desired characteristics is marketed, for example, under the names Winnofil S (ICI) and Socal 213 (Solvay).

As mentioned earlier, the quantities of magnesium hydroxide and calcium carbonate must be such that they ensure the desired flame-retardant effect without compromising the mechanical properties of the final compound. In particular, the total quantity of the two inorganic compounds varies from about 100 to about 200 parts by weight per 100 parts of base polymer, preferably from about 140 to about 160 parts by weight, with a quantity of about 150 parts by weight being particularly preferred.

The ratio by weight of magnesium hydroxide to calcium carbonate may vary from about 3:1 to about 2:3, preferably from about 2:1 to about 3:4, with a ratio of about 1:1 being particularly preferred.

Phosphorus compounds suitable for the present composition are those known in the art to confer flame-retardant properties to the polymer to which they are added. Examples of said compounds suitable to the purpose are those mentioned earlier and include salts of phosphorous and phosphoric acids (phosphites, phosphates or polyphosphates), organic esters and polyesters of phosphoric acid (mono-, di- or tri-alkyl or -aryl phosphates or polyphosphates), phosphites (mono-, di- or tri-alkyl or -aryl phosphites), phosphonates or polyphosphonates (mono- or di-alkyl or -aryl phosphonates or polyphosphonates) where the alkyl groups are preferably ($C_2$–$C_{12}$) alkyl groups, while the aryl groups are preferably phenyl, mono-, di- or tri-substituted phenyl, where the substituent is selected independently between ($C_1$–$C_4$) alkyl and hydroxy.

In general, since the use of additive in the form of water-soluble salts may cause undesired changes in the electrical insulating capacity of the coating compound, in cases where the conductor must be covered with a coating that ensures adequate electrical insulation, it is preferable to avoid the use of phosphorus additives in the form of water-soluble salts.

In particular, it is preferable to use organic phosphorus compounds that also have plasticizing properties, such as the aforesaid esters of phosphoric acid; the preferred ones are dialkyl, diaryl, alkylaryl, trialkyl, triaryl, dialkylaryl or alkyldiaryl phosphates, where the alkyl groups are preferably of the ($C_2$–$C_{12}$) alkyl groups, while the aryl groups are preferably phenyl, where the substituent is selected independently between ($C_1$–$C_4$) alkyl and hydroxy, since the triaryl- or alkyldiaryl phosphates are particularly preferred. Examples of said compounds are isopropyldiphenyl phosphate, t-butyldiphenyl phosphate, 2-ethylhexyl-diphenyl phosphate, isodecyldiphenyl phosphate, triphenyl phosphate, trixylenyl phosphate or tricresyl phosphate. Triphenyl phosphate is preferably used.

The quantity by weight of phosphorus compound with respect to the base polymer depends on the percentage of phosphorus in the compound. When triphenyl phosphate (%P in weight=9.5%) is used, for example, this quantity may vary from about 1:10 to about 1:30, with a ratio of about 1:20 by weight being preferred. More generally, regardless of the phosphorus compound used, the quantity in weight of phosphorus with respect to the base polymer may vary from about 1:100 to about 1:300, with a ratio of about 1:200 by weight being preferred.

The nitrogen compounds that can be favorably used in the present composition are those capable of furnishing the desired synergic effect with the phosphorous compounds described above. Examples of said compounds are those mentioned earlier and include inorganic salts, such as salts of ammonium, or organic compounds and their organic salts, such as guanidine, melamine and their derivatives, e.g. melamine cyanide or guanidilurea and their salts. Compounds containing both phosphorus and nitrogen may also be used, such as phosphates or polyphosphates of ammonium, guanidine or melamine, phosphoramides, phosphorylamides, phosphonated starch and phosphonitrile compounds.

As with the phosphorus compounds, in those cases where it is necessary to coat the conductor with a sheath that provides sufficient electrical insulation, it is preferable to avoid the use of nitrogen derivatives in the form of water-soluble salts.

In particular, it is preferable to use simple organic compounds with a high nitrogen concentration, such as melamine, guanidine, urea and their derivatives (melamine cyanide or guanidilurea), while the use of melamine is particularly preferred.

Because of the aforesaid problems of toxicity of the respective degradation products, it is preferable to keep the quantity of nitrogen compounds at the lowest level compatible with the desired flame-retardant defect. The quantity by weight of nitrogen compound with respect to the base polymer depends on the percentage of nitrogen in the compound. When using melamine (%N=66% by weight), for example, it is preferable to use ratios below 1:50 by weight of nitrogen compound to base polymer, while compositions containing a ratio by weight of about 1:200 of nitrogen to base polymer are still efficacious. More generally, regardless of the nitrogen compound used, the quantity by weight of nitrogen with respect to the base polymer may vary from about 1:75 to about 1:300.

In general, the ratio by weight of phosphorus to nitrogen varies from about 1:4 to about 2:1, with a ratio of about 1.5:1 being preferable. If a blend of triphenyl phosphate and melamine is used, for example, the ratio by weight of the two compounds varies from about 2:1 to about 15:1, with a ratio of about 2.5:1 being preferable.

The base compounds to which the flame-retardant composition of the invention is added may be compounds based on halogen-free polymers, chosen, for example, from polyolefins, copolymers of polyolefins, olefin/ester copolymers, polyesters, polyethers, polyether/polyester copolymers and mixtures thereof; Examples of these polymers are polyethylene (PE), polypropylene (PP), ethylene-propylene rubber (EPR), ethylene-propylene-diene copolymer, natural rubber, butyl rubber, ethylene-vinyl acetate copolymer (EVA), ethylene-ethyl acrylic copolymer (EEA), ethylene-α-olefin copolymer and their blends. Among these, EVA/PE, EVA/EPR, PP/PE and EEA/PE blends are preferred, with an EVA/PE blend being preferred, particularly an 80:20 EVA/PE blend, where the percentage of vinyl acetate in the EVA copolymer amounts preferably to about 28%.

The blend may also typically contain an antioxidant agent selected among those commonly used in the art. Examples of such antioxidants are 2,2,4-trimethyl-1,2-dihydroquinoline (polymerized), tetrakis methyl (3,5-diterbutyl-4-hydroxyhydrocinnamate) methane and n-octadecyl-3(3',5'-di-t-butyl-4-hydroxyphenyl) propionate.

The compound may also advantageously contain a cross-linking system, of the peroxide or silane type, for example. It is preferable to use a silane-based cross-linking system, using peroxides as grafting agents. Examples of peroxides that can be appropriately used, both as cross-linking agents or as grafting agents for the silanes, are di(terbutylperoxypropyl-(2))-benzene, dicumyl peroxide, terbutylcumyl peroxide, 1,1-di(ter-butylperoxy)-3,3,5-termethyl cyclohexane, terbutylperoxy-3,5,5-trimethyl hexanoate, ethyl 3,3-di(terbutylperoxy) butyrate. Examples of silanes that can be appropriately used are ($C_1$–$C_4$) alkyloxy vinyl silanes, such as vinyldimethoxyethoxysilane, vinyltriethoxysilane or vinyldimethoxyethoxysilane.

The cross-linking system also includes a cross-linking catalyst, chosen among those known in the art. In the case of cross-linking with silanes, for example, lead dibutyl dilaurate may be appropriately used.

As stated earlier, one preferred application of compounds containing the flame-retardant composition of the invention regards the sheath of cables, particularly for telecommunications and power transmission. Specific examples of cables that can be appropriately coated with the flame-retardant compound of the invention are cables for telephone exchanges or low-voltage cables for building construction.

Typically, the compound is prepared by blending the polymer components and flame-retardant additives of the invention, e.g. in an internal blender of the Banbury type or in other continuous blenders like the Ko-Kneader (Buss) or twin-screw types. Typically, the blend thus obtained is granulated and dried.

When a cross-linked product is desired, the granules of the aforesaid blend are mixed with the appropriate cross-linking system, e.g. in a continuous mixer. The cross-linking catalyst is preferably added later, during the cable preparation phase.

The polymer mixture thus obtained may then be used to coat a conductor, typically of copper or aluminum, by means of extrusion, for example, obtaining a coated cable covered with just the flame-retardant compound of the invention. As an alternative, the conductor may be covered first with an initial layer of coating, preferably insulating, formed, for example, of another polymer or copolymer not having the desired flame-retardant characteristics, preferably chosen from those mentioned earlier (e.g. cross-linked polyethylene). This initial layer of coating is then covered with the flame-retardant compound of the invention. This produces a cable with a double layer of coating, where the more external layer possess the desired flame-retardant properties. The thickness of the innermost layer may be as much as 50% of the total thickness of the sheath. The total thickness of the sheath (single- or double-layer) will vary according to the thickness of the conductor and the reference standards. For example, a conductor with a cross-section area of 1.5 $mm^2$ will have a total thickness insulating coating of about 0.7 mm.

If the compound is cross-linkable, the extrusion will be followed by cross-linking. This is general accomplished in steam or nitrogen for peroxide cross-linking agents or in the air or in sauna in the case of silane cross-linking agents.

The cables according to the invention show the desired flame-retardant characteristics when subjected to normal non-inflammability tests. In particular, cables covered with a polymer compound containing the flame-retardant composition of the invention pass the test of non-inflammability in the presence of flame, in accordance with IEC 332.1 standards.

Said sheaths also maintain the mechanical characteristics of extensibility and maximum load within the limits acceptable for final product use. In particular, based on tests under IEC 811 standards, they display extensibility values of at least 100%, typically at least 150%, and maximum load values of at least 5 Mpa, typically at least 12.5 Mpa.

To better illustrate the various aspects of the invention, the following examples are provided.

EXAMPLE 1

Preparation of the compounds

Nine types of compounds were prepared (three for comparison and six according to the invention) in the following manner.

80 parts by weight of ethyl-vinyl acetate copolymer containing 28% of vinyl acetate (EVA) were blended with 20 parts of low-density polyethylene (PE) and with variable quantities of the flame-retardant additives of the invention (see table 1), in a Banbury-type mixer for a period of about 6 minutes. Magnesium hydroxide and calcium carbonate were used with the following specific surface and particle size characteristics:

$Mg(OH)_2$: spec. surface 6.0 $m^2/g$, particle size 1.0 μm;
$CaCO_3$: spec. surface 25 $m^2/g$, particle size 0.080 μm.

Triphenyl phosphate was used as a phosphorus compound, while melamine was used as a nitrogen compound.

The base thus obtained was granulated and placed to dry in a vacuum for about 48 hours at 60° C.

The composition of compounds 1–9 is shown in detail in table 1 below, which includes both the comparison compounds 1–3 (which do not contain all the constituents of the flame-retardant composition) and the flame-retardant compounds according to the invention (4–9).

TABLE 1

Composition of the comparison compounds (1–3) and flame-retardant compounds according to the invention (4–9)

|  | 1 | 2 | 3 | 4 | 5 | 6 | 7 | 8 | 9 |
|---|---|---|---|---|---|---|---|---|---|
| Mg(OH)$_2$ | 150 | 150 | n.p. | 100 | 75 | 110 | 70 | 75 | 75 |
| CaCO$_3$ | n.p. | n.p. | 150 | 50 | 75 | 40 | 80 | 75 | 75 |
| Triphenyl phosphate | n.p. | 5 | 5 | 5 | 5 | 5 | 8 | 5 | 8 |
| Melamine | n.p. | 2 | 2 | 2 | 2 | 2 | 2 | 0.5 | 2 |

Polymer base: EVA/PE 80/20
The quantities of components in the compounds is expressed in parts by weight
"n.p." = component not present The granules of compound obtained as described above were then mixed in a continuous Ko-Kneader (Buss) mixer with a cross-linking system formed of 0.20 parts by weight of 1,1 -diterbutylperoxy-3,3,5trimethylcyclohexane, 6,00 parts by weight of vinyldimethoxyethoxysilane (0.05 parts of lead dibutyl dilaurate catalyst were added at the time of extrusion).

EXAMPLE 2

Mechanical and flame-retardant properties of compounds 1–9

The compounds 1–9 obtained according to example 1 were then extruded (adding the cross-linking catalyst) onto a copper conductor with a cross-section area of 1–5 mm$^2$, for a thickness of the insulating layer of 0.7 mm.

The mechanical resistance characteristics of the coatings thus obtained are shown in table 2 below. In particular, the values of elongation at break and ultimate tensile load were measured, in accordance with IEC 811 standards.

TABLE 2

Mechanical properties of the coatings with compounds 1–9 (IEC 811 stand.)

|  | 1 | 2 | 3 | 4 | 5 | 6 | 7 | 8 | 9 |
|---|---|---|---|---|---|---|---|---|---|
| Ultimate tensile load (Mpa) | 15 | 15 | 13 | 14 | 14 | 14 | 12 | 14 | 13 |
| Elongation at break (%) | 150 | 170 | 220 | 200 | 200 | 200 | 250 | 200 | 230 |

Coating thickness = 0.7 mm.

The aforesaid compounds 1–9 were also extruded onto an identical copper conductor, previously coated with an insulating layer of cross-linked polyethylene (not flame-retardant) for a thickness of 0.2 or 0.35 mm. The total thickness of the cables sheath with double insulating layer is in all cases still 0.7 mm, as with the single layer of compounds 1–9.

The cables thus covered (single- or double-layer) were subjected to the inflammability test under flame conditions, in accordance with IEC 332-1 standards.

The results were recorded in table 3 below, where "cable 0.7" indicates the copper conductor coated with only compounds 1–9 with thickness 0.7 mm, while "cable 0.5/0.2" and "cable 0.35/0.35" indicates the copper conductor with a double layer of insulating sheath, in which the internal layer of polyethylene is 0.2 and 0.35 mm thick, respectively, and the outer coating of compound 1–9 is 0.5 and 0.35 mm thick, respectively.

TABLE 3

Results of the flame-retardant test in accordance with IEC 332-1.

|  | 1 | 2 | 3 | 4 | 5 | 6 | 7 | 8 | 9 |
|---|---|---|---|---|---|---|---|---|---|
| Cable 0.7 | + | + | ++ | ○ | ○ | ○ | ○ | ○ | ○ |
| Cable 0.5/0.2 | ++ | ++ | ++ | ○ | ○ | ○ | ○ | ○ | ○ |
| Cable 0.35/0.35 | ++ | ++ | ++ | + | ○ | + | + | ○ | ○ |

Legend:
"○" = cable does not burn
"+" cable burns sometimes
"++" = cable burns every time For the aforesaid cables "0.7" and "0.5/0.2", covered with a layer of flame-retardant compound no. 5, the insulation constant at 90° C. was also determined, in accordance with IEC 502-1 standards, obtaining the following results:

Cable "0.7", $K_i$=1.5 MΩ·km

Cable "0.5/0.2", $K_i$=1800 MΩ·km

Similar results are believed to be achievable also for compounds with an EVA/EPR, PP/PE or EEA/PE base containing the fire-retardant composition of the invention, as well as for cables covered with said compounds.

What is claimed is:

1. Cable comprising a conductor and a sheath in which the sheath includes at least a layer of polymer compound, based on halogen-free polymers, wherein said sheath contains a predetermined quantity of a flame-retardant composition comprising magnesium hydroxide, calcium carbonate, at least one phosphorus compound and at least one nitrogen compound, such as to give flame retardant characteristics to said sheath.

2. Cable according to claim 1 wherein the sheath of said cable satisfies the flame-retardant characteristics in the presence of flame in accordance with IEC 332.1 standards.

3. Cable according to claim 1 wherein the predetermined quantity of flame-retardant composition is added to the base polymer of the sheath in a ratio by weight of about 1:1 to about 2:1.

4. Cable according to claim 3 wherein said ratio is from about 1.4:1 to about 1.6:1.

5. Cable according to claim 1 wherein the calcium carbonate of the composition has a specific surface greater than about 10 m$^2$/g.

6. Cable according to claim 1 wherein said flame-retardant composition contains a total quantity of magnesium hydroxide and calcium carbonate of from about 100 to about 200 parts by weight per 100 parts of base polymer.

7. Cable according to claim 6 wherein said total quantity of magnesium hydroxide and calcium carbonate is from about 140 to about 160 parts by weight per 100 parts of base polymer.

8. Cable according to claim 1 to wherein the ratio of magnesium hydroxide to calcium carbonate is from about 3:1 to about 2:3.

9. Cable according to claim 8 wherein said ratio of magnesium hydroxide to calcium carbonate is from about 2:1 to about 3:4.

10. Cable according to claim 1 wherein the quantity by weight of phosphorus compound with respect to base polymer is from about 1:10 to about 1:30.

11. Cable according to claim 10 wherein said phosphorus compound is a phosphoric ester.

12. Cable according to claim 1 wherein the quantity by weight of nitrogen compound with respect to base polymer varies from about 1:50 to about 1:200.

13. Cable according to claim 1 wherein the base polymer of the sheath is selected from among polyolefins, copolymers of polyolefins, olefin/ester copolymers, polyesters, polyethers, polyether/polyester copolymers or their blends.

14. Cable according to claim 13 wherein said base polymer is selected from among polyethylene, polypropylene, ethylene-propylene rubber, ethylene-propylenediene copolymer, natural rubber, butyl rubber, ethylene-vinyl acetate copolymer, ethylene-ethyl acrylic copolymer, ethylene- -olefin copolymer or their blends.

15. Cable according to claim 13 wherein said base polymer is selected from among ethyl-vinyl acetate/ polyethylene, ethyl-vinyl acetate/propylene rubber, polypropylene/polyethylene or ethylene-ethyl acetate/ polyethylene.

16. Cable according to claim 1 wherein the sheath is composed of a single layer.

17. Cable according to claim 1 wherein the sheath is composed of a double layer with the innermost layer in contact with the conductor composed of a polymer compound without flame-retardant properties.

18. A method for conferring flame-retardant properties on a cable with a sheath containing a halogen-free polymer compound, wherein to said polymer compound is added a predetermined quantity of a composition containing magnesium hydroxide, calcium carbonate, at least one phosphorus compound and at least one nitrogen compound.

19. A method according to claim 18 wherein the ratio by weight of said added composition with respect to the base polymer compound is from about 1:1 to about 2:1.

20. A polymer blend based on halogen-free polymers containing a predetermined quantity of a halogen-free flame-retardant composition comprising magnesium hydroxide, calcium carbonate, at least one phosphorus compound and at least one nitrogen compound.

21. A polymer blend according to claim 6 wherein said predetermined quantity of flame-retardant composition is added to the base polymer of the blend in a ratio by weight of from about 1:1 to about 2:1.

22. A method for conferring flame-retardant properties on a polymer based on halogen-free polymers comprising the steps of:

(a) adding to said polymer a predetermined quantity of a composition comprising magnesium hydroxide, calcium carbonate, at least one phosphorus compound and at least one nitrogen compound;

(b) mixing said polymer with said composition to form a polymer blend;

(c) granulating said polymer blend; and (d) drying said polymer blend.

23. Cable according to claim 4 wherein said ratio is about 1.5:1.

24. Cable according to claim 7 wherein said total quantity of magnesium hydroxide and calcium carbonate is about 150 parts by weight.

25. Cable according to claim 9 wherein said ratio of magnesium hydroxide to calcium carbonate is about 1:1.

26. Cable comprising a conductor and a sheath in which the sheath includes at least a layer of polymer compound, based on halogen-free polymers, wherein said sheath contains a predetermined quantity of a flame-retardant composition comprising magnesium hydroxide, calcium carbonate, at least one phosphorus compound selected from the group consisting of salts of phosphorous or phosphoric acids including phosphites, phosphates and polyphosphates; organic esters or polyesters of phosphoric acid including mono-, di-alkyl, tri-alkyl, or -aryl phosphates and polyphosphates; phosphonates and polyphosphonates including mono-alkyl, di-alkyl, or -aryl phosphonates or polyphosphonates; and at least one nitrogen compound selected from the group consisting of inorganic nitrogen containing salts or organic nitrogen containing compounds and their organic nitrogen containing salts, such as to give flame retardant characteristics to said sheath.

27. The cable according to claims 26 wherein the phosphorous compound has a $C_2$–$C_{12}$ alkyl group.

28. The cable according to claim 26 wherein the phosphorous compound is an aryl compound having a phenyl group or mono-, di- or tri-substituted phenyl group.

29. The cable according to claim 26, wherein the phosphorous compound is selected from the group consisting of triphenylphosphate, phosphate/oligomeric phosphate, organic phosphonate, red phosphorous, ammonium polyphosphate, and melamine/piperazine phosphate.

30. The cable according to claim 26 wherein the nitrogen compound is selected from ammonium salts, melamine, urea, guanidine, melamine cyanide or guanidilurea and salts thereof.

31. The cable according to claim 26 wherein the nitrogen compound is selected from the melamine, cyanurated melamine, ammonium polyphosphate or melamine/ piperazine phosphate.

32. The cable according to claim 26 wherein the nitrogen and phosphorous compounds are the same and are selected from organic phosphonate, ammonium polyphosphate, or melamine/piperazine phosphate.

* * * * *

UNITED STATES PATENT AND TRADEMARK OFFICE
CERTIFICATE OF CORRECTION

PATENT NO. : 6,555,605 B1 Page 1 of 1
DATED : April 29, 2003
INVENTOR(S) : Flavio Casiraghi It is certified that error appears in the above-identified patent and that said Letters Patent is hereby corrected as shown below:

Column 8,
Line 62, "claim 1 to wherein" should read -- claim 1 wherein --.

Column 9,
Line 18, "ethylene- -olefin" should read -- ethylene-α-olefin --.
Line 44, "claim 6" should read -- claim 20 --.

Column 10,
Line 46, "from the melamine," should read -- from melamine, --.
Line 51, "polyphosphate, or" should read -- polyphsphate or --.

Signed and Sealed this

Thirtieth Day of March, 2004

JON W. DUDAS
*Acting Director of the United States Patent and Trademark Office*